United States Patent

Shima et al.

[11] Patent Number: 5,946,170
[45] Date of Patent: Aug. 31, 1999

[54] TAPE CASSETTE WITH SELECTED WALL THICKNESSES

[75] Inventors: Motohiko Shima; Masaru Ikebe, both of Nagano, Japan

[73] Assignee: TDK Corporation, Japan

[21] Appl. No.: 08/914,133

[22] Filed: Aug. 18, 1997

[30] Foreign Application Priority Data

Aug. 27, 1996 [JP] Japan .................................. 8-242561

[51] Int. Cl.⁶ .................................................. G11B 23/02
[52] U.S. Cl. ........................................ 360/132; 242/347
[58] Field of Search ........................... 360/132; 242/347, 242/347.1, 345.2, 343, 343.1; 206/389, 391, 403, 409

[56] References Cited

U.S. PATENT DOCUMENTS

| | | | |
|---|---|---|---|
| 4,438,860 | 3/1984 | Okamura et al. | 242/326.2 |
| 5,189,583 | 2/1993 | Okamura et al. | 360/132 |
| 5,201,476 | 4/1993 | Gelardi et al. | 242/346 |
| 5,398,147 | 3/1995 | Johanson et al. | 360/132 |
| 5,411,219 | 5/1995 | Yi et al. | 242/347 |
| 5,516,056 | 5/1996 | Kwon et al. | 242/345.2 |

FOREIGN PATENT DOCUMENTS

| | | |
|---|---|---|
| 0 411 622 | 2/1991 | European Pat. Off. . |
| 0 542 244 | 5/1993 | European Pat. Off. . |
| 0 568 057 | 11/1993 | European Pat. Off. . |
| 0 568 061 | 11/1993 | European Pat. Off. . |
| 0 616 326 | 9/1994 | European Pat. Off. . |
| 90 17 073 | 5/1991 | Germany . |
| 59-161578 | 10/1984 | Japan . |
| 64-24575 | 2/1989 | Japan . |
| 5-342807 | 12/1993 | Japan . |
| 2 294 922 | 5/1996 | United Kingdom . |

*Primary Examiner*—Brian E. Miller
*Attorney, Agent, or Firm*—Lerner, David, Littenberg, Krumholz & Mentlik, LLP

[57] ABSTRACT

A tape cassette capable of ensuring smooth guiding of a reel brake member arranged in a casing while being simplified in structure and exhibiting an attractive appearance sufficient to increase a commercial value thereof. A reel brake member for selectively restraining rotation of tape reels received in a casing is arranged in the casing so as to be engageable with the tape reels to keep a tape from being loosened. Ribs are arranged in an upper casing member in a manner to be remote from gate positions, at which gates of a molding die for molding the casing are located, and contiguous to a rear wall of the upper casing member. A portion of the upper casing member surrounded by the ribs is reduced in thickness as compared to the remaining portion of the upper casing member.

16 Claims, 3 Drawing Sheets

TAPE CASSETTE WITH SELECTED WALL THICKNESSES

BACKGROUND OF THE INVENTION

This invention relates to a tape cassette suitable for use for a magnetic recording/reproducing apparatus such as, for example, a video tape recorder (VTR) or the like, and more particularly, to a tape cassette which has a tape-like record medium received in a casing while being wound on tape reels and is provided therein with a reel brake mechanism for regulating rotation of the tape reels in no-use thereof, such as an 8 mm video tape cassette, a digital video cassette or the like.

It has been conventionally known in the art that a tape cassette which has a tape-like medium received in a casing while being wound on a pair of tape reels is provided with a reel brake mechanism for keeping each of the tape reels from being rotated in non-use of the tape cassette. The reel brake mechanism is generally constructed in such a manner that an elastic member such as a torsion coil spring, a leaf spring or the like is arranged in the casing so as to urge a brake member against a tooth-like ruggedness provided on an outer periphery of a flange of each of the tape reels. When the tape cassette is charged in a recording/reproducing apparatus, a reel brake release member of the recording/reproducing apparatus is abutted against the reel brake member to rearwardly slide the reel brake member against elastic force of the elastic member or spring, to thereby release the reel brake member from the tape reels, so that the tape reels may rotate. For such a reel brake mechanism, various structures for stably operating the reel brake member have been proposed.

For example, Japanese Utility Model Application Laid-Open Publication No. 161578/1984 discloses a structure for arranging a high reel brake to guide the reel brake on an inner surface of a casing and providing L-shaped ribs in a lower casing member to slidably guide the reel brake in the ribs. Also, Japanese Utility Model Application Laid-Open Publication No. 24575/1989 discloses a structure wherein a guide rib is arranged in an upper casing member to slide a reel brake member on the guide rib or a guide member is provided separately from a casing to slide the reel brake member on the guide member.

Unfortunately, the former structure described above causes positioning of the reel brake member to be unstable during assembling of the tape cassette, resulting in incorporation of the reel brake member in the casing being highly troublesome, because the height of the reel brake member is large as described above. The latter structure described above is simplified in construction but causes sink marks to be markedly produced on an outer surface of the tape cassette during molding of the casing to deteriorate an appearance of the cassette because the rib is arranged in the upper casing member. More particularly, although arrangement of the guide rib for guiding slide of the reel brake member in the upper casing member renders movement of the reel brake member stable, it causes sink marks to be produced on a portion of the upper casing member on which the guide rib is arranged during the molding, to thereby deteriorate an appearance of the tape cassette, resulting in a commercial value of the tape cassette being highly deteriorated, because the portion is substantially remote from gate positions of the tape cassette. Also, in the latter structure, arrangement of the separate guide member in the lower casing member causes the number of parts to be increased, leading to a failure to facilitate assembling of the tape cassette.

SUMMARY OF THE INVENTION

The present invention has been made in view of the foregoing disadvantages of the prior art.

Accordingly, it is an object of the present invention to provide a tape cassette which is capable of permitting a reel brake member to be readily guided while being simplified in construction.

It is another object of the present invention to provide a tape cassette which is capable of facilitating incorporation of a reel brake member in a casing.

It is a further object of the present invention to provide a tape cassette which is capable of exhibiting an appearance sufficient to increase a commercial value of the tape cassette.

In accordance with the present invention, a tape cassette is provided. The tape cassette includes a casing including an upper casing member and a lower casing member and having gate positions located therein at which gates of a molding die for molding the casing are correspondingly defined, a pair of tape reels rotatably received in the casing, a tape wound on the tape reels and arranged so as to reversibly travel from any one of the tape reels through a front surface of the casing to the other of the tape reels while being stretchedly extended between the tape reels, a cover operating mechanism arranged for selectively exposing the tape on the front surface of the casing and including a front cover for selectively covering a front surface of a portion of the tape positioned on the front surface of the casing, and a reel brake member arranged in a manner to be engageable with the tape reels to selectively restrain rotation of the tape reels. The tape cassette of the present invention thus generally constructed is featured in that ribs are arranged in a manner to be remote from the gate positions of the casing and contiguous to a rear wall of the casing, to thereby provide the casing with a rib surrounded portion and the rib surrounded portion of the casing is formed with a thickness smaller than that of the remaining portion of the casing.

In a preferred embodiment of the present invention, the gate positions of the casing are defined on a front surface of the upper casing and the ribs include guide ribs arranged on a rear side of the upper casing member for guiding the reel brake member, wherein the rib surrounded portion of the casing is defined by the guide ribs.

In a preferred embodiment of the present invention, the upper casing member includes additional ribs each of which is arranged to be substantially contiguous to both the rear wall and a side wall of the upper casing member, to thereby define a surrounded corner portion of the casing, wherein the surrounded corner portion of the casing is formed with a thickness smaller than that of the remaining portion of the casing.

In a preferred embodiment of the present invention, the ribs each have a thickness substantially equal to that of the rib surrounded portion of the casing.

In a preferred embodiment of the present invention, the thickness of the remaining portion of the casing is set to be about 1.0 mm and the thickness of the rib surrounded portion is set to be about 0.5 to 0.8 mm. More preferably, the thickness of the rib surrounded portion of the casing may be set to be about 0.6 to 0.7 mm. The ribs may be formed with a thickness of about 0.6 to 0.8 mm.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
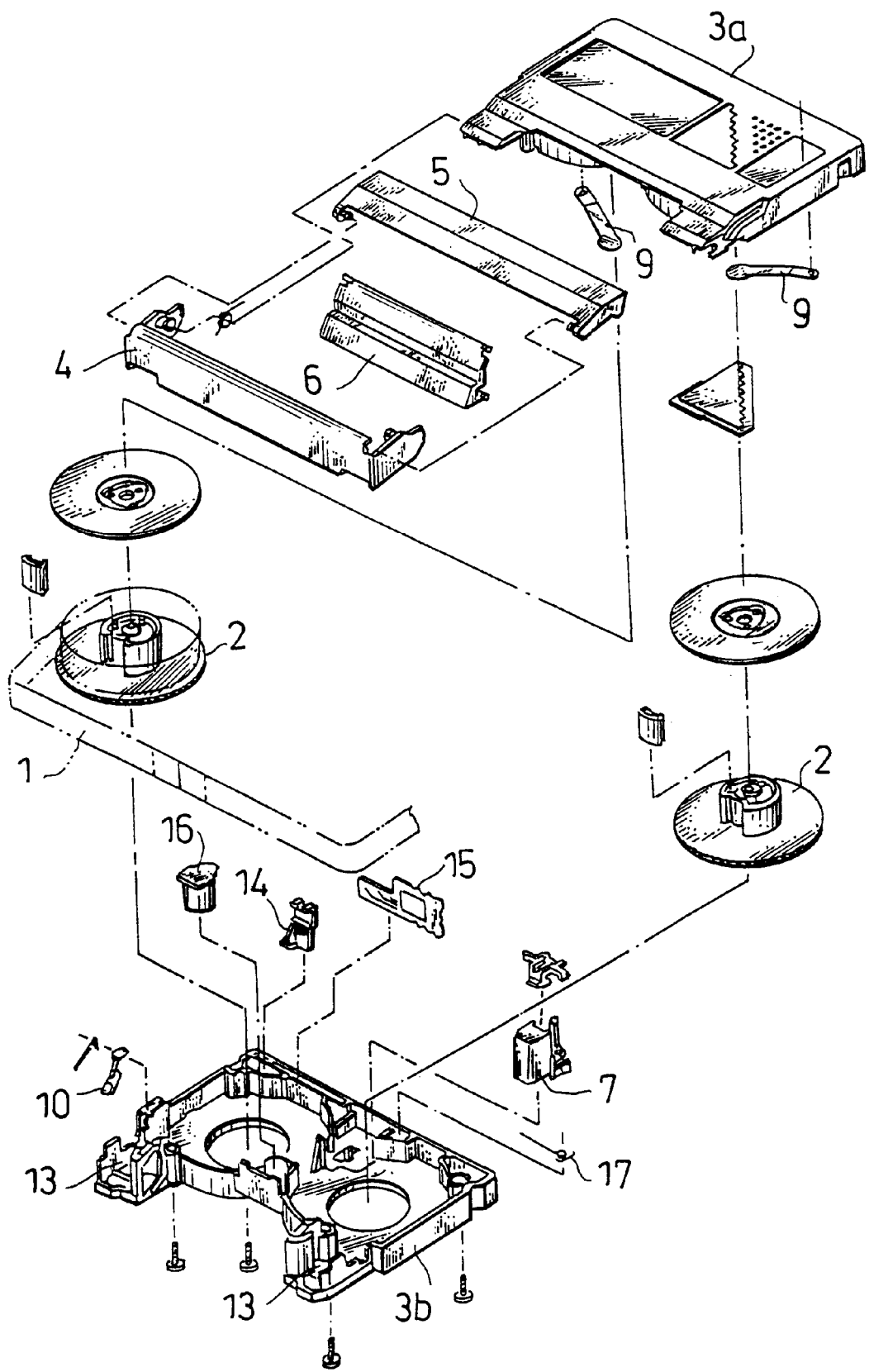
FIG. 1 is an exploded perspective view showing an embodiment of a tape cassette according to the present invention.

Now, a tape cassette according to the present invention will be described hereinafter with reference to FIGS. 1 to 4 of the accompanying drawings. A tape cassette of the illustrated embodiment is embodied in the form of a digital video cassette (DVC). The tape cassette includes a casing 3 formed by joining an upper casing member 3a and a lower casing member 3b to each other. Also, it includes a pair of tape reels 2 rotatably received in the casing 3 and a tape 1 wound on the tape reels 2 so as to be stretchedly extended therebetween. The casing 3 is formed on both sides of a front surface thereof with a pair of openings 13 which permit an interior of the casing 3 to communicate with an exterior thereof. The tape 1 is arranged so as to be reversibly guided from any one of the tape reels 2 through one of the openings 13 to an exterior of the front surface of the casing 3 and then through the other opening 13 to the other reel while being stretched between both tape reels 2. Further, the tape cassette includes a cover operating mechanism for selectively exposing a portion of the tape 1 guided along the front surface of the casing 3. The cover mechanism includes a front cover 4 for selectively covering a front surface of the portion of the tape 1 guided along the front surface of the casing 3, an upper cover 5 for selectively covering an upper end of the portion of the tape 1 and a rear cover 6 for selectively covering a rear surface of the portion of the tape 1. Moreover, the tape cassette includes a reel brake member 7 arranged in a manner to be engageable with the tape reels 2 to selectively restrain rotation of the tape reels 2. The upper casing member 3a has gate positions 30 located at a front portion thereof at which gates of an injection mold for molding the upper casing member 3a are correspondingly defined. The upper casing member 3a includes ribs 31, 32, 33 and 34 arranged in a region thereof remote or far from the gate positions 30 and contiguous to a rear wall of the upper casing member 3a. The ribs 31 and 32 each serve as a guide rib for guiding the reel brake member 7. The ribs 33 each act as a reinforcement support for a central portion of the casing 3. The ribs 34 each act as a rib for partitioning a tape reel area and one of the ribs 34, in association with the rear wall of the casing 3, defines a receiving section 36 for receiving a memory element (MIC) 15 therein.

Figure 2:
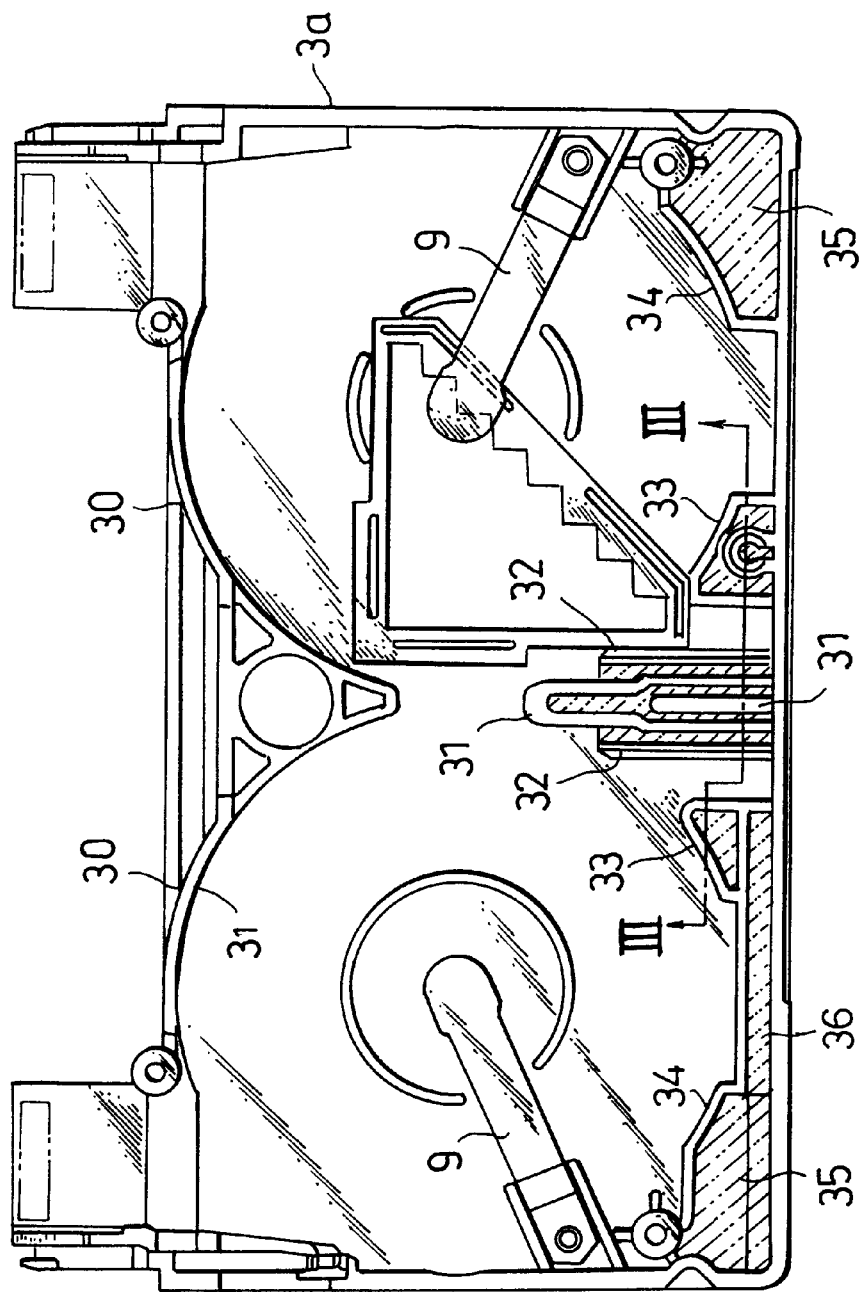
FIG. 2 is an enlarged bottom plan view showing an upper casing member constituting a part of a casing of the tape cassette shown in FIG. 1.
Figure 3:
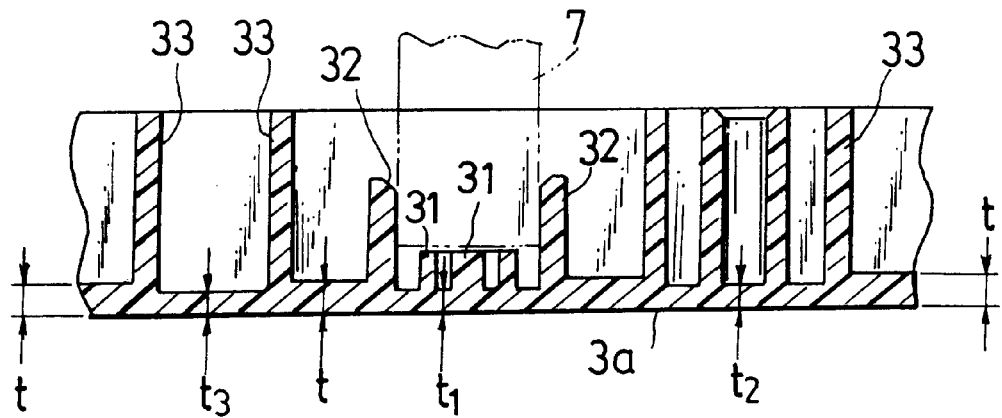
FIG. 3 is an enlarged vertical sectional view taken along line III—III of FIG. 2.
Figure 4:
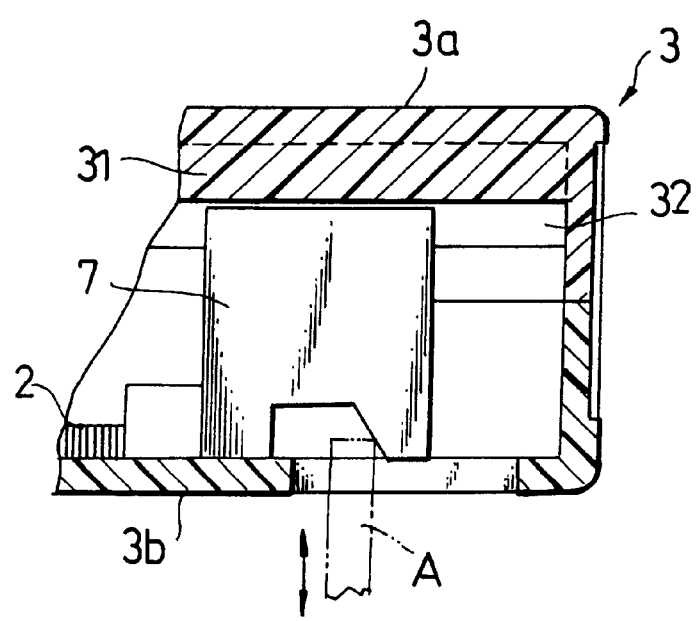
FIG. 4 is a fragmentary sectional view showing an essential part of the tape cassette of FIG. 1.

Also, the upper casing member 3a is so constructed that portions thereof surrounded by the ribs 31 to 34 are each formed with a thickness smaller than that of the remaining portion thereof other than these portions. In FIG. 2, the rib surrounded portions of the upper casing member 3a are indicated by hatched areas. In the illustrated embodiment, some of the thicknesses of the rib surrounded portions are indicated at $t_1$, $t_2$ and $t_3$ by way of example in FIG. 3. Likewise, a thickness of the remaining portion of the upper casing member 3a is indicated at t. Such construction effectively prevents formation of sink marks on the upper casing member 3a and therefore the casing 3 during molding of the casing.

In the illustrated embodiment, for example, the thickness t of the remaining portion of the upper casing 3a may be set to be 1.0 mm and the thicknesses $t_1$, $t_2$ and $t_3$ of the rib surrounded portions may each be set to be 0.5 to 0.8 mm and preferably 0.6 to 0.7 mm. Also, the ribs 31 to 34 may each be formed with a thickness of 0.6 to 0.8 mm.

In the illustrated embodiment, the gate positions 30 are located at a front wall $3_1$, of the upper casing member 3a. The guide ribs 31 and 32, the reinforcement support ribs 33, and the tape reel area partitioning ribs 34 are arranged on a rear side of the upper casing member 3a. Also, the portions of the upper casing member 3a at peripheries of the ribs, as described above, are each formed with a thickness $t_1$, $t_2$ or $t_3$ smaller than the thickness t of the remaining portion of the upper casing member 3a.

The reel brake member 7 is arranged on the rear side of the casing 3 and constantly urged toward the tape reels 2 by means of a spring 17. The reel brake member 7 is rearwardly slid by a brake release member A of a recording/reproducing apparatus, to thereby be released from engagement with the tape reels 2, resulting in the tape reels 2 being permitted to freely rotate, when the tape cassette is charged in the recording/reproducing apparatus. The guide ribs 31 and 32 described above are arranged in the upper casing member 3a for the purpose of ensuring smooth movement of the reel brake member 7. More particularly, the guide ribs 31 and 32 act to guide an upper portion of the reel brake member 7 and a side portion thereof, respectively. The gate positions 30 of the upper casing member 3a are defined on the front wall $3_1$ of the casing 3, so that sink marks are apt to be formed on a portion of the outer surface of the upper casing member 3a in proximity to the guide ribs 31 and 32 positioned remote from the gate positions 30. In order to avoid this problem, the upper casing member 3a is reduced in thickness of the portion thereof partitioned by each of the ribs 31 to 33 as compared to the remaining portion thereof, to thereby prevent formation of sink marks. The tape reel area partitioning ribs 34 are each arranged at each of both ends of the rear wall $3_1$ of the upper casing member 3a to extend near a corresponding one of side walls of the upper casing member 3a. However, arrangement of the ribs 34 at both ends of the rear wall is relatively sparse, resulting in formation of the sink marks at peripheral regions or surrounded corner portions 35 of the upper casing member 3a being less. Nevertheless, the surrounded corner portions 35 may be reduced in thickness, because some sink marks possibly occur depending on the gate positions and molding conditions. It is preferable that the above-described thicknesses $t_1$, $t_2$ and $t_3$ are substantially equal to a thickness of the ribs 31 to 34.

In the illustrated embodiment, the upper casing member 3a is provided therein with springs 9 which function to pressedly support the respective tape reels 2 and the lower casing member 3b is provided therein with a lid lock 10, an erasure prevention plug 14, the memory element (MIC) 15 and an optical cover 16.

As can be seen from the foregoing, the tape cassette of the present invention includes the casing including the upper casing member and lower casing member joined to each other and having the gate positions located therein at which the gates of the molding die for molding the casing are defined, a pair of the tape reels in a rotatable manner, the tape wound on the tape reels and arranged so as to reversibly travel from any one of the tape reels through the front surface of the casing to the other of the tape reels while being stretchedly extended between the tape reels, the cover operating mechanism arranged for selectively exposing the tape at the front surface of the casing and including the front cover for selectively covering the front surface of the portion of the tape positioned on the front surface of the casing, and the reel brake member arranged in a manner to be engageable with the tape reels to selectively restrain rotation of the tape reels. The tape cassette of the present invention thus generally constructed is featured in that the ribs are arranged remote from the gate positions of the casing and contiguous to the rear wall of the casing, to thereby provide the casing with the rib surrounded portion, wherein the rib surrounded portion of the casing is formed with a thickness smaller than that of the remaining portion of the casing. Such construction ensures stable operation of the reel brake member while simplifying a structure of the tape cassette and prevents formation of sink marks on an outer surface of the casing to provide the tape cassette with a good appearance. Also, such construction highly facilitates assembling of the tape cassette while keeping strength of the casing from being deteriorated and ensures safe handling of the tape cassette and an increased in productivity thereof.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette comprising:
    a casing defining a front surface and including an upper casing member including a substantially rectangular top plate, a pair of depending side walls, a depending rear wall, and a depending front wall, a lower casing member, and gate positions located therein at which gates of a molding die for molding said casing are correspondingly defined;
    a pair of tape reels rotatably received in said casing, said top plate of said upper casing member including a major portion thereof extending from said front wall and substantially covering said pair of tape reels, said major portion having a first thickness;
    a tape wound on said tape reels and arranged so as to reversibly travel from any one of said tape reels through said front surface of said casing to the other of said tape reels while being stretchedly extended between said tape reels;
    a cover operating mechanism arranged for selectively exposing said tape on said front surface of said casing and including a front cover for selectively covering a front surface of a portion of said tape positioned on said front surface of said casing;
    a reel brake member arranged within said casing in a manner to be movable into a position in engagement with said tape reels to selectively restrain rotation of said tape reels; and
    ribs depending from said top plate of said upper casing member to guide said movement of said reel brake member and arranged in a manner to be remote from said gate positions of said casing and contiguous to said rear wall of said casing whereby said ribs and said rear wall define a rib surrounded portion of said casing;
    said rib surrounded portion of said casing having a second thickness, said second thickness being smaller than said first thickness.

2. A tape cassette as defined in claim 1, wherein said gate positions of said casing are defined on said front surface of said casing member.

3. A tape cassette as defined in claim 2, wherein said first thickness is about 1.0 mm and said second thickness is about 0.5 to 0.8 mm.

4. A tape cassette as defined in claim 3, wherein said second thickness is about 0.6 to 0.7 mm.

5. A tape cassette as defined in claim 1, wherein said ribs comprise first ribs and said upper casing member includes second ribs said second ribs being substantially contiguous to both said rear wall and one of said side walls of said upper casing member, whereby said second ribs, said rear wall and said one of said side walls define a surrounded corner portion of said casing, said surrounded corner portion of said casing having a third thickness, said third thickness being smaller than said first thickness.

6. A tape cassette as defined in claim 5, wherein said first thickness is about 1.0 mm and said second thickness is about 0.5 to 0.8 mm.

7. A tape cassette as defined in claim 2, wherein said ribs comprise first ribs and said upper casing member includes second ribs said second ribs being substantially contiguous to both said rear wall and one of said side walls of said upper casing member, whereby said second ribs, said rear wall and said one of said side walls define a surrounded corner portion of said casing, said surrounded corner portion of said casing having a third thickness, said third thickness being smaller than said first thickness.

8. A tape cassette as defined in claim 7, wherein said first thickness is about 1.0 mm and said second thickness is about 0.5 to 0.8 mm.

9. A tape cassette as defined in claim 1, wherein said first thickness is about 1.0 mm and said second thickness is about 0.5 to 0.8 mm.

10. A tape cassette as defined in claim 9, wherein said ribs are formed with a thickness of about 0.6 to 0.8 mm.

11. A tape cassette as defined in claim 9, wherein said second thickness is about 0.6 to 0.7 mm.

12. A tape cassette as defined in claim 11, wherein said ribs are formed with a thickness of about 0.6 to 0.8 mm.

13. A tape cassette as defined in claim 1 wherein said reel brake member includes an upper portion and a side portion, and wherein said ribs comprise at least one first guide rib for guiding said upper portion of said reel brake member and at least one second guide rib for guiding said side portion of said reel brake member.

14. A tape cassette as defined in claim 13 wherein said at least one first guide rib has a first height as defined from said top plate of said upper casing member and said at least one second guide rib has a second height as defined from said top plate of said upper casing member, said second height being greater than said first height.

15. A tape cassette as defined in claim 14 wherein said at least one second guide rib includes a plurality of guide ribs.

16. A tape cassette as defined in claim 15 wherein said at least one first guide rib is interposed between said plurality of second guide ribs.

* * * * *